United States Patent
Irokawa et al.

(10) Patent No.: US 6,604,423 B1
(45) Date of Patent: Aug. 12, 2003

(54) PRESSURE SENSOR, PRESSURE SENSOR CONTROL APPARATUS, AND PRESSURE SENSOR SYSTEM

(75) Inventors: Kenji Irokawa, Ibaraki-ken (JP); Koichi Katsumata, Mitsukaido (JP); Emi Motegi, Soka (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/689,848

(22) Filed: Oct. 13, 2000

(30) Foreign Application Priority Data

Oct. 15, 1999 (JP) .......................................... 11-294153

(51) Int. Cl.$^7$ ................................................ G01L 7/00
(52) U.S. Cl. ...................................................... 73/714
(58) Field of Search ........................ 73/753, 708, 721, 73/714, 705, 702, 766; 340/310.06, 870, 200, 52, 310, 705, 870.37; 361/283

(56) References Cited

U.S. PATENT DOCUMENTS

| | | | |
|---|---|---|---|
| 4,586,108 A | * 4/1986 | Frick | 361/283 |
| 4,598,381 A | * 7/1986 | Cucci | 364/558 |
| 5,119,679 A | * 6/1992 | Frisch | 74/705 |
| 5,558,414 A | * 9/1996 | Kubota | 305/122 |
| 5,684,451 A | * 11/1997 | Seberger et al. | 340/310.06 |
| 5,690,797 A | * 11/1997 | Harada et al. | 204/229 |
| 5,889,464 A | * 3/1999 | Huang | 340/442 |

FOREIGN PATENT DOCUMENTS

| | | |
|---|---|---|
| GB | 2215150 | 9/1989 |
| GB | 2325743 | 12/1998 |
| JP | 5-256542 | 10/1993 |
| JP | 5-87457 | 11/1993 |
| JP | 6-249730 | 9/1994 |
| JP | 8-166306 | 6/1996 |
| JP | 10-339680 | 12/1998 |
| KR | 1996-0014000 | 10/1996 |
| KR | 1997-0005737 | 4/1997 |

OTHER PUBLICATIONS

"Microelectronic Circuits," published by Oxford University Press(1982), pp. 85–86.

* cited by examiner

Primary Examiner—Hezron Williams
Assistant Examiner—Marissa Ferguson
(74) Attorney, Agent, or Firm—Paul A. Guss

(57) ABSTRACT

The type of a pressure sensor is automatically identified even when the input/output lines of the pressure sensor are three lines, i.e., power source lines (two of + and −) and a voltage output line for outputting a voltage corresponding to an applied pressure. The current value Ip, which flows through the power source lines of the pressure sensor, is made to be a different value depending on each type of the pressure sensor. A voltage value Vr (Vr=Ip×Rr, where Rr is a resistance value of a resistor) is measured by using a differential amplifier, and the voltage value Vr is compared with a voltage range previously recorded in ROM. Accordingly, the type of the pressure sensor can be automatically identified by using a microcomputer.

13 Claims, 5 Drawing Sheets

PRESSURE SENSOR, PRESSURE SENSOR CONTROL APPARATUS, AND PRESSURE SENSOR SYSTEM

BACKGROUND OF THE INVENTION

1. Field of the Invention

The present invention relates to a pressure sensor, a pressure sensor control apparatus, and a pressure sensor system which make it possible to perform automatic identification (automatic discrimination) of the type of the pressure sensor.

2. Description of the Related Art

Recently, the pressure sensor is widely used to measure the pressure of the pressure fluid or the like. Usually, the pressure sensor comprises a main pressure sensor body such as a semiconductor strain gauge, and an amplifier for outputting a voltage signal corresponding to a pressure applied to the main pressure sensor body. A casing of the pressure sensor is provided with DC (direct current) power source input terminals composed of two terminals for supplying the DC power source to the main pressure sensor body and to the amplifier, and a voltage signal output terminal for outputting the voltage signal corresponding to the applied pressure.

That is, the pressure sensor requires three input/output lines in total (three connecting terminals), i.e., two lines for supplying the DC power source and one line for outputting the voltage signal.

Conventionally, in order to identify the type of the pressure sensor, it is necessary to discriminate, by visual observation, the type name affixed to the pressure sensor by means of, for example, printing.

Practically, the voltage signal output of the pressure sensor is connected to a pressure sensor control apparatus. When the type is identified by means of the visual observation, it is necessary to perform the setting operation in order to allow the pressure sensor control apparatus to correspond to the type.

However, the pressure sensor itself is decreased in size in accordance with the recent advance to realize the small size and the light weight. It is difficult to easily identify the type name by means of the visual observation. Further, a problem arises such that it is also troublesome to perform the setting operation to allow the pressure sensor control apparatus to respond to the type of the pressure sensor. Further, in many cases, the pressure sensor is arranged at a position separated from the pressure sensor control apparatus to which the pressure sensor is connected. A problem also arises such that it is troublesome to identify the type name of the pressure sensor in such cases.

A pressure sensor has been suggested as a technique for solving the foregoing problems. That is, the pressure sensor is provided with a newly added terminal for outputting a type-identifying signal voltage for identifying the type. The input/output lines of the pressure sensor are composed of four lines in total (four connection terminals), i.e., two lines for supplying the DC power source, one line for outputting the voltage corresponding to the applied pressure, and one line for the terminal for outputting the type-identifying signal. In this arrangement, the type-identifying signal voltage is allowed to have a voltage value which differs depending on the type of the pressure sensor. Therefore, the type can be automatically identified by measuring the type-identifying signal voltage.

However, in the case of the pressure sensor having the four connection terminals, the input/output lines are four. Therefore, the production cost is increased corresponding thereto when the pressure sensor is produced. As a result, a problem arises such that the production cost is also increased when the pressure sensor control apparatus is produced.

Practically, a multi-conductor cable is frequently used for the input/output lines in some cases. However, in this case, a problem arises such that the cost of the four-conductor cable is more expensive than that of the three-conductor cable.

Another problem also arises such that when the input/output lines are four, the reliability of the signal connection is decreased as compared with the case in which the input/output lines are three.

SUMMARY OF THE INVENTION

The present invention has been made taking the foregoing problems into consideration, an object of which is to provide a pressure sensor, a pressure sensor control apparatus, and a pressure sensor system which make it possible to reliably identify the type even when the input/output lines are three.

According to the present invention, there is provided a pressure sensor comprising DC power source input terminals composed of two terminals, and a signal output terminal for outputting a signal corresponding to an applied pressure; the pressure sensor further comprising a power source current-setting means for allowing a power source current value flowing through the DC power source input terminals to be a power source current value which is different depending on a type of the pressure sensor.

According to the present invention, the power source current-setting means is used so that the power source current value flowing through the DC power source input terminals of the pressure sensor is allowed to be the power source current value which is different depending on the type of the pressure sensor. Accordingly, it is possible to obtain the pressure sensor in which the type can be identified while maintaining the three input/output lines, by detecting the power source current value.

According to another aspect of the present invention, there is provided a pressure sensor control apparatus to be connected with DC power source input terminals composed of two terminals, and a signal output terminal for outputting a signal corresponding to an applied pressure, of a pressure sensor, for performing predetermined process in accordance with the signal output; the pressure sensor control apparatus comprising a power source current value-detecting means for detecting a power source current value flowing through the DC power source input terminals; and a type-identifying means for identifying a type of the pressure sensor in accordance with the detected power source current value.

According to the present invention, the power source current value, which is supplied to the pressure sensor and which is allowed to flow through the DC power source input terminals, is detected by the power source current value-detecting means. Therefore, the type of the pressure sensor can be identified by means of the type-identifying means on the basis of the detected power source current value.

Since the power source current value is detected, the pressure sensor control apparatus capable of identifying the type can be obtained, while maintaining the three input/output lines for the pressure sensor.

In this arrangement, the pressure sensor control apparatus is constructed to include a plurality of connection terminals which make it possible to simultaneously connect a plurality of pressure sensors having different power source current values. Accordingly, it is possible to simultaneously identify the types of the plurality of pressure sensors by using one pressure sensor control apparatus.

According to still another aspect of the present invention, there is provided a pressure sensor system comprising pressure sensors set to have power source current values which are different from each other depending on types; and a pressure sensor control apparatus including a type-identifying means to which the pressure sensors are connected, for detecting the power source current value to identify the type of the pressure sensor when predetermined process is performed in accordance with an output of the pressure sensor.

According to the present invention, it is possible to construct the pressure sensor system in which each of the pressure sensors and the pressure sensor control apparatus are connected to one another by using three lines.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An embodiment of the present invention will be explained below with reference to the accompanying drawings.

Figure 1:
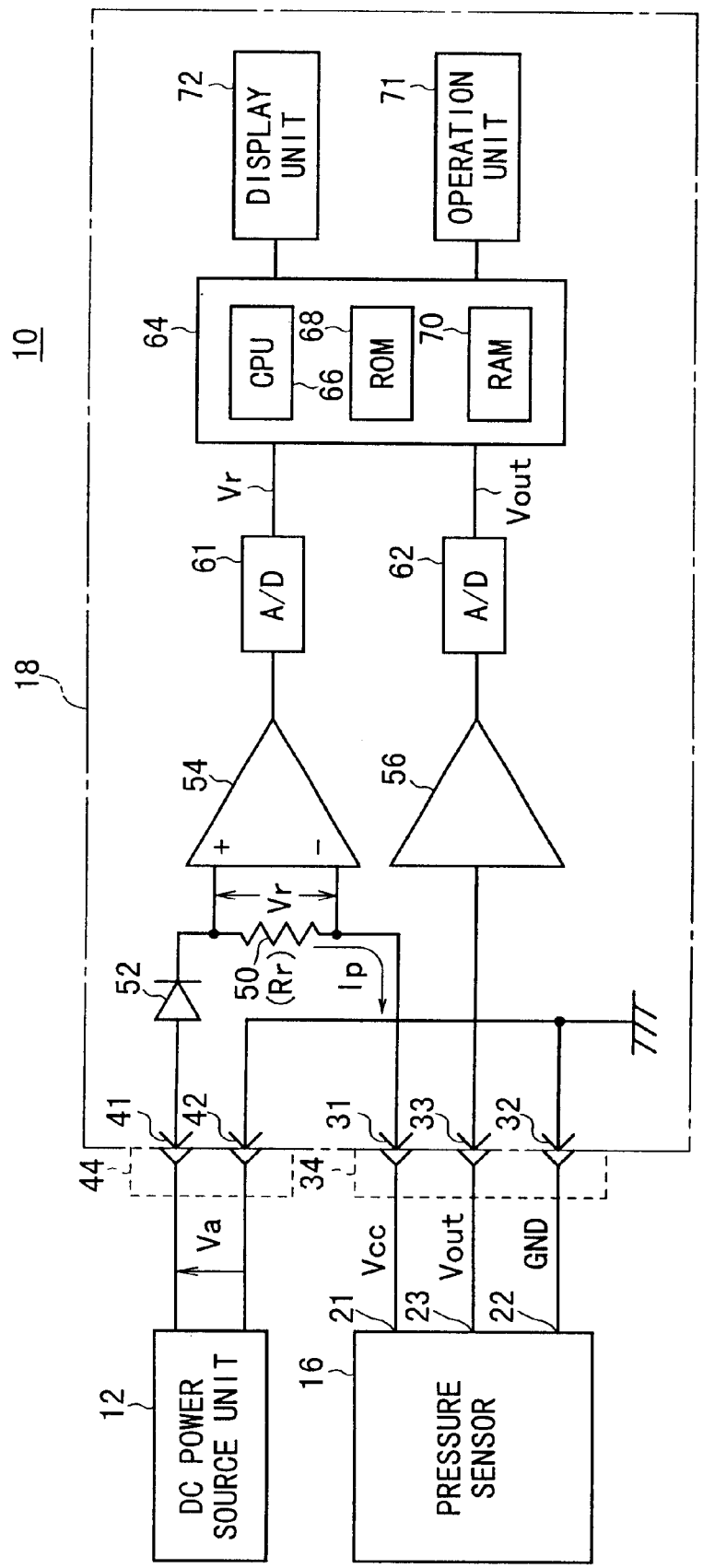
FIG. 1 shows a circuit block diagram illustrating an arrangement of a pressure sensor system to which an embodiment of the present invention is applied.

FIG. 1 shows an arrangement of a pressure sensor system 10 to which the embodiment of the present invention is applied. The pressure sensor system 10 comprises a DC power source unit 12 for outputting a power source voltage Va (voltage value is also referred to as Va, and this term is also referred to as "DC power source Va"), a pressure sensor 16 having DC power source input terminals 21, 22 composed of two terminals, and a signal output terminal 23 for outputting a voltage signal Vout (voltage value is also referred to as Vout) corresponding to an applied pressure, and a pressure sensor control apparatus 18 for performing predetermined process such as pressure display process in accordance with the voltage signal Vout. The DC power source unit 12 can be also incorporated into the pressure sensor control apparatus 18.

Figure 2:
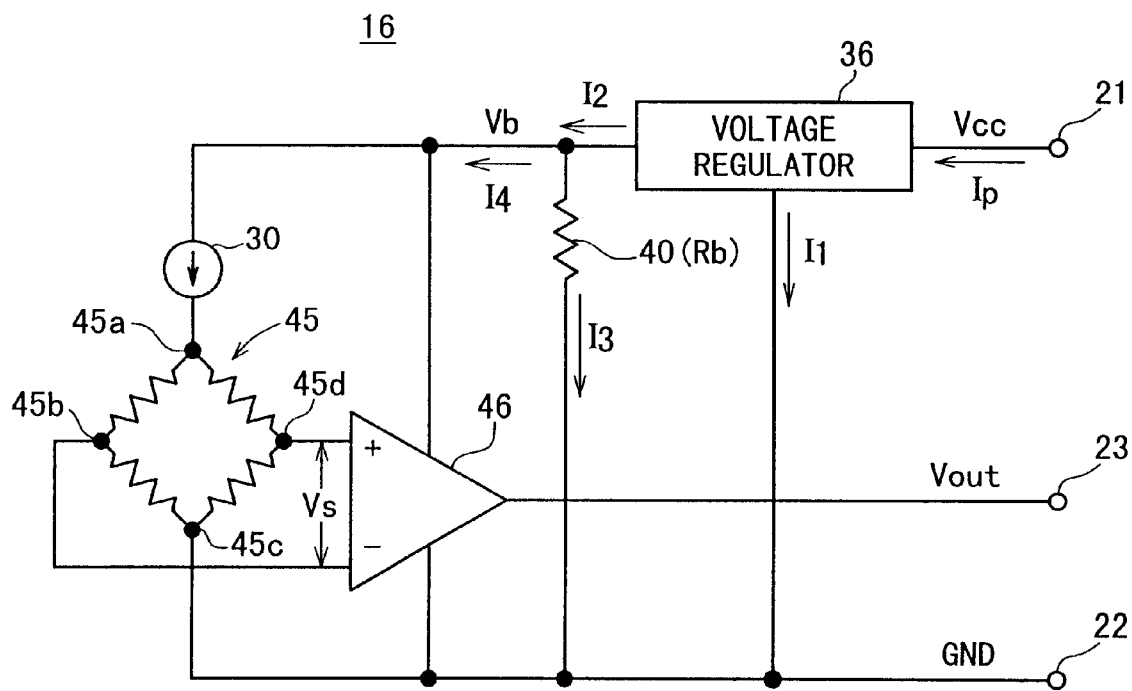
FIG. 2 shows a circuit block diagram illustrating a detailed arrangement of a pressure sensor included in the pressure sensor system of the embodiment shown in FIG. 1.

FIG. 2 shows an exemplary arrangement of the pressure sensor 16. The pressure sensor 16 has a semiconductor main pressure sensor body 45 connected, in a bridge form, with a semiconductor strain gauge which is operated with a constant current supplied from a constant current source 30. In the main pressure sensor body 45, a voltage signal Vs (voltage value is also referred to as Vs), which is generated between terminals 45b, 45d depending on the applied pressure, is supplied to a differential amplifier 46. The differential amplifier 46 amplifies the voltage signal Vs to obtain a voltage signal Vout corresponding to the applied pressure so that the voltage signal Vout is supplied to the signal output terminal 23.

In this arrangement, a DC power source Vb (voltage value is also referred to as Vb), which is obtained by converting a DC power source Vcc (voltage value is also referred to as Vcc) supplied from the DC power source input terminals 21, 22, into a constant voltage by using a voltage regulator 36 as a three-terminal regulator, is supplied to the constant current source 30 and the differential amplifier 46 respectively.

In this case, a resistor 40 having a resistance value of Rb, which serves as the power source current-setting means, is connected between the output terminal of the voltage regulator 36 and the ground (GND) terminal 22. The resistor 40 functions such that a power source current Ip (current value is also referred to as Ip), which is supplied from the DC power source input terminal 21, is allowed to have a power source current value Ip which differs depending on the type of the pressure sensor 16. The resistor 40 may be a variable resistor.

In this arrangement, as clarified from FIG. 2, the power source current Ip is calculated in accordance with the following expression (1).

$$Ip = I1 + I2 = I1 + I3 + I4 = I1 + Vb/Rb + I4 \quad (1)$$

In this case, the current I1 represent the current flowing from the voltage regulator 36 to the ground terminal 22. The current I2 represents the current flowing from the voltage regulator 36 to the load side. The current I3 represents the current flowing through the bleeder resistor 40 as the power source current-setting means. The current I4 represents the current obtained by combining the currents flowing through the main pressure sensor body 45, the constant current source 30, and the differential amplifier 46.

According to the expression (1), it is understood that the value of the power source current Ip can be changed by changing the resistance value Rb of the bleeder resistor 40.

With reference to FIG. 1, the pressure sensor control apparatus 18 includes terminals 41, 42 to which a connector-equipped lead wire 44 is connected, and terminals 31, 32, 33 to which a connector-equipped lead wire 34 is connected.

In this arrangement, the DC power source Va is supplied from the DC power source unit 12 to the terminals 41, 42 via the connector-equipped lead wire 44. The terminal 42 and the terminal 32 are grounded. A diode 52 for protection, and a resistor 50 having a resistance value Rr (power source current-detecting means) to serve as a precise small resistor for detecting the power source current value Ip are connected between the terminal 41 and the terminal 31. The terminals 31, 32 are connected to the DC power source input terminals 21, 22 of the pressure sensor 16 via the connector-equipped lead wire 34.

In this arrangement, the DC power source Vcc{Vcc=Va−(forward direction voltage of diode 52+Rr×Ip)}, which is obtained by lowering the voltage of the DC power source Va with the diode 52 and the resistor 50, is supplied to the terminal 21.

The signal output terminal 23, which outputs the voltage signal Vout corresponding to the applied pressure of the pressure sensor 16, is connected to the terminal 33 via the connector-equipped lead wire 34.

The voltage signal Vout is supplied to an A/D converter 62 via an amplifier 56, and it is supplied as a voltage signal (designated by Vout) as a digital signal to a microcomputer 64.

A voltage signal Vr (voltage value is also referred to as Vr), which is generated at the both ends of the resistor 50 for detecting the power source current value Ip, is supplied to an A/D converter 61 via a differential amplifier 54, and it is supplied as a voltage signal (designated by Vr) as a digital signal to the microcomputer 64 which functions as the type-identifying means.

The microcomputer 64 is a computer comprising CPU (central processing unit) 66, ROM (including EEPROM) 68 as a memory, RAM (random access memory) 70, and other components including, for example, an input/output unit and a timer as a time-measuring means. The microcomputer 64 functions as a control unit, a calculating unit, and a processing unit.

Those stored in ROM 68 are a voltage-current conversion table for converting the voltage signal Vr proportional to the power source current value Ip as the consumption current of the pressure sensor 16 into the power source current value Ip, and a power source current-type conversion table for identifying the type of the pressure sensor from the converted power source current value Ip. It is needless to say that the voltage-current conversion table and the power source current-type conversion table are possessed by combining them into one type identification table. Alternatively, an expression for calculation may be possessed instead of the table.

Figure 3:
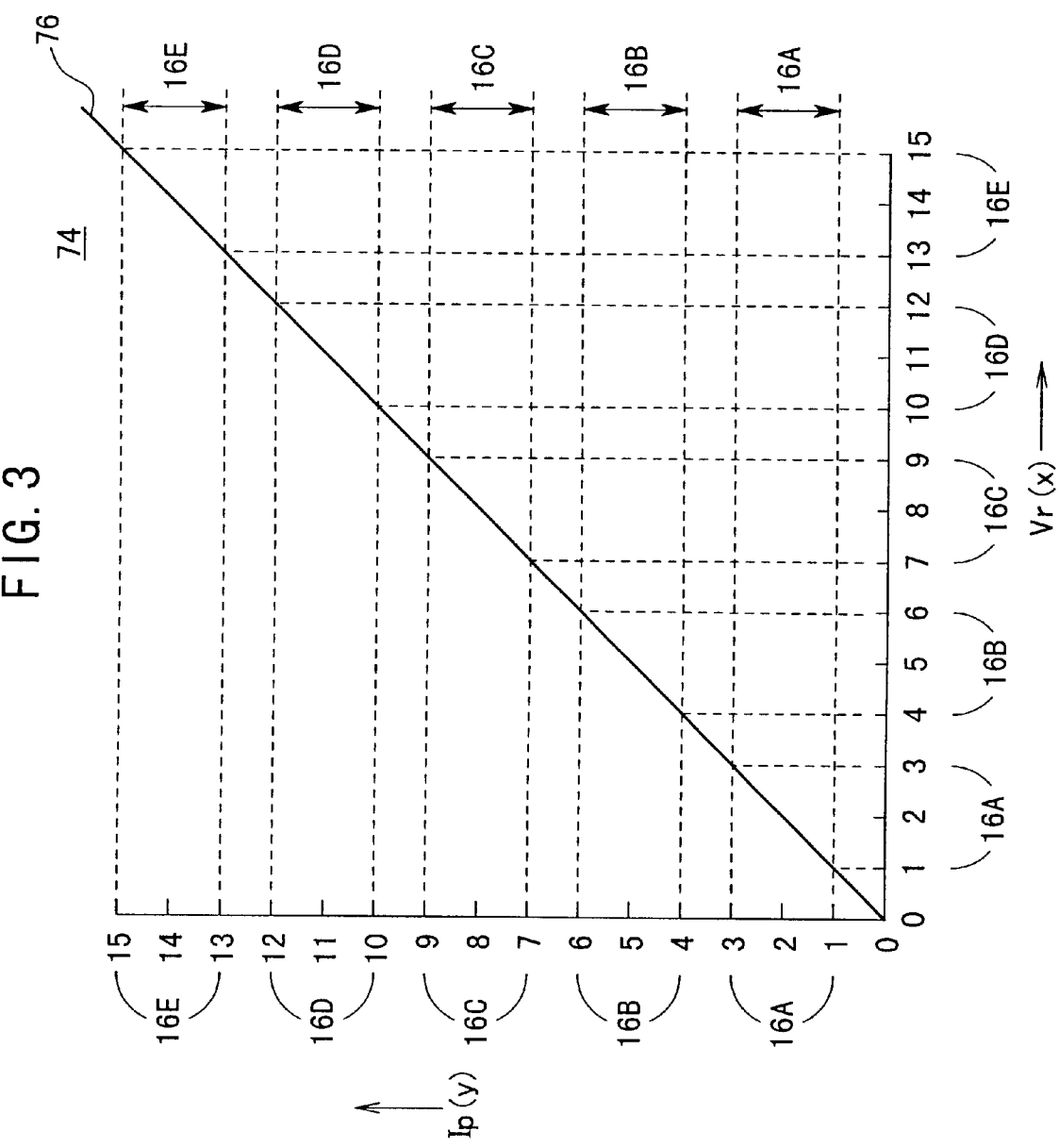
FIG. 3 shows a diagram illustrating an exemplary construction of a type conversion table stored in ROM.

FIG. 3 shows an exemplary construction of the type conversion table 74 written in ROM 68. In FIG. 3, the characteristic 76 of the straight line indicates the characteristic of the differential amplifier 54.

The type conversion table 74 of the embodiment shown in FIG. 3 can be used to automatically identify the five kinds (five types) of the pressure sensors 16A to 16E concerning the range of the power source current Ip(y) with respect to the output voltage signal Vr(x) of the differential amplifier 54, i.e., the pressure sensor 16A between Ip(1) to Ip(3) corresponding to the threshold value Vr(1) to Vr(3) of the voltage signal Vr, the pressure sensor 16B between Ip(4) to Ip(6) corresponding to the threshold value Vr(4) to Vr(6), the pressure sensor 16C between Ip(7) to Ip(9) corresponding to the threshold value Vr(7) to Vr(9), the pressure sensor 16D between Ip(10) to Ip(12) corresponding to the threshold value Vr(10) to Vr(12), and the pressure sensor 16E between Ip(13) to Ip(15) corresponding to the threshold value Vr(13) to Vr(15).

For example, the spacing distance between the threshold value Vr(3) and the threshold value Vr(4) is provided in order to avoid any erroneous identification concerning the adjacent pressure sensors 16A and 16B.

Further, a voltage-pressure conversion table or a voltage-pressure calculating expression for converting the voltage signal Vout corresponding to the applied pressure of the pressure sensor 16 into the pressure value is stored in ROM 68. The voltage-pressure conversion table or the calculating expression, which corresponds to the pressure sensor 16, is automatically selected depending on the result of the automatic identification of the type of the pressure sensor 16.

Those connected to the microcomputer 64 are a display unit 72 for displaying the measured pressure value measured by the pressure sensor 16 and the type identification name (for example, type name, model, or type code represented by numerals and alphabets) of the pressure sensor 16 automatically identified by the microcomputer 64, and an operation unit 71 for performing various input operations.

Next, explanation will be made principally for the function of the pressure sensor system 10 of the embodiment shown in FIG. 1 to automatically identify the type.

At first, as shown in FIG. 1, the DC power source unit 12 and the pressure sensor 16 are connected to the pressure sensor control apparatus 18 via the connector-equipped-lead wires 44, 34 respectively.

At this time, the voltage drop is caused in the resistor 50 by the power source current Ip which is the consumption current flowing through the pressure sensor 16. The voltage signal Vr is obtained between the terminals of the resistor 50.

The voltage signal Vr is amplified by the differential amplifier 54, and it is supplied as the digital voltage signal Vr to the microcomputer 64 via the A/D converter 61.

The microcomputer 64 refers the digital voltage signal Vr and the threshold value Vr(x) in the type conversion table 74 to discriminate the appropriate threshold value range Vr(x) to Vr(x+2) (in this expression, x has any one of values of 1, 4, 7, 10, and 13) in which the voltage signal Vr is included. The microcomputer 64 automatically identifies the pressure sensor 16 which meets with the threshold value range Vr(x) to Vr(x+2).

The unillustrated voltage-pressure conversion table or the voltage-pressure calculating expression, which is used to convert the voltage signal Vout corresponding to the applied pressure of the identified pressure sensor 16 into the pressure value, is automatically selected on the basis of the result of the automatic identification. After that, the voltage signal Vout is converted into the pressure value in accordance with the selected voltage-pressure conversion table or the calculating expression, and the pressure value is displayed on the display unit 72.

If the voltage signal Vr is a voltage value which is without the threshold value range Vr(x) to Vr(x+2) in the type conversion table 74, the error indication is made on the display unit 72.

As described above, according to the embodiment explained above, the resistor 40, which serves as the power source-setting means for making the power source current value Ip flowing through the DC power source input terminals 21, 22 of the pressure sensor 16 to be the current value that is different depending on the type of the pressure sensor 16, is attached in the pressure sensor 16. The power source current value Ip, which flows through the DC power source input terminal 21, is detected by the pressure sensor control apparatus 18. The detected value of the power source current value Ip can be used to automatically identify the type of the pressure sensor 16.

According to the embodiment described above, it is enough that the input/output lines of the pressure sensor 16 are the three lines for the power source voltage Vcc, the output voltage signal Vout, and the ground GND. Therefore, an advantage is also obtained such that it is unnecessary to change the casing of the pressure sensor 16 from the conventional one.

Figure 4:
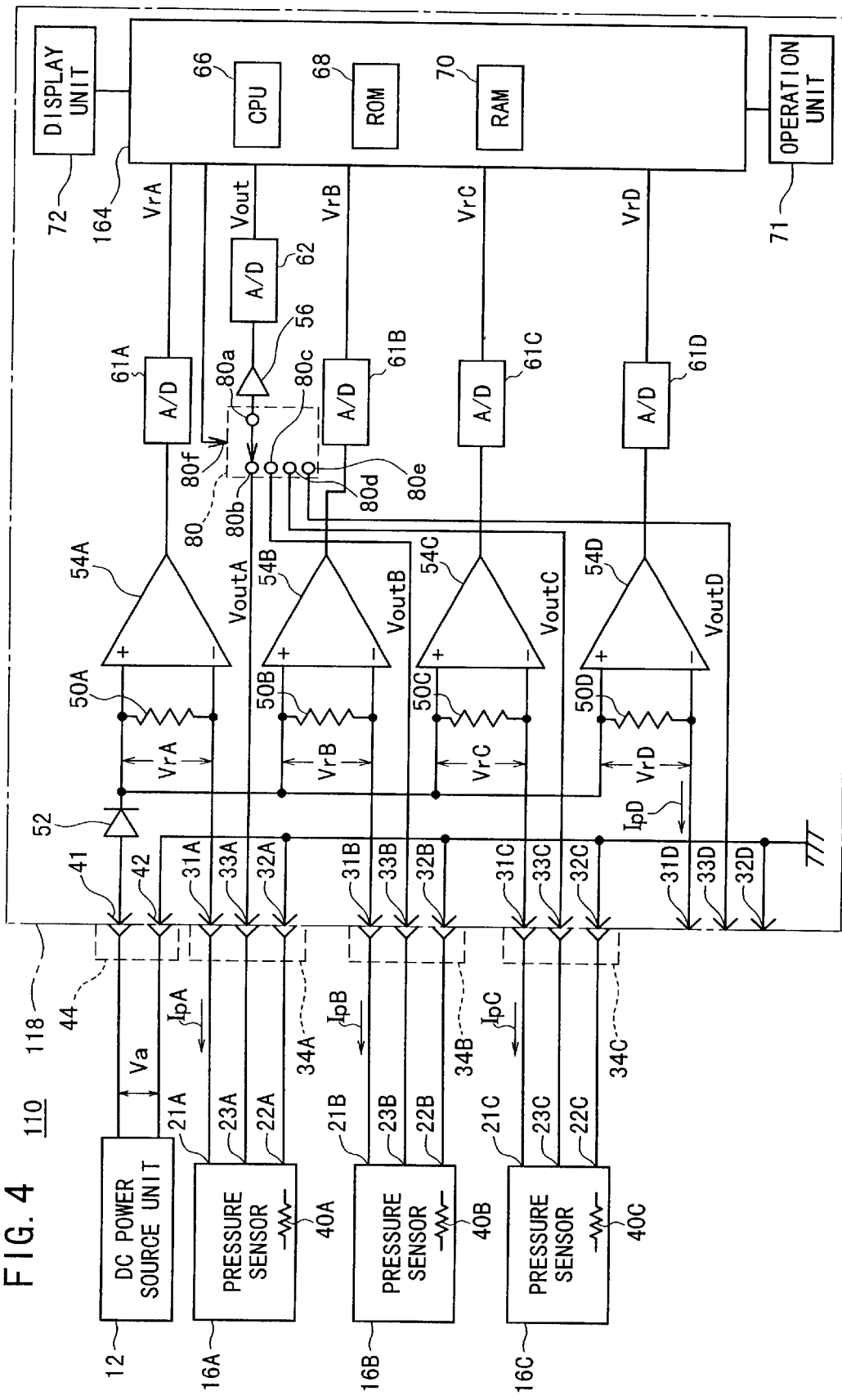
FIG. 4 shows a circuit block diagram illustrating an arrangement of a pressure sensor system to which another embodiment of the present invention is applied.

FIG. 4 shows an arrangement of a pressure sensor system 110 according to another embodiment of the present invention.

In the pressure sensor system 110 of the embodiment shown in FIG. 4, the components or parts corresponding to those shown in FIGS. 1 to 3 are designated by the same reference numerals or by reference numerals affixed with alphabets A, B, C, D, detailed explanation of which will be omitted.

In the pressure sensor system 110, three types of pressure sensors 16A, 16B, 16C are connected to a pressure sensor control apparatus 118 via connector-equipped-lead wires 34A, 34B, 34C respectively.

The pressure sensors 16A, 16B, 16C have the same circuit connection arrangement as that of the pressure sensor 16 shown in FIG. 2, and they include resistors 40A, 40B, 40C as the power source current-setting means for providing different values of the power source current Ip respectively.

The pressure sensor control apparatus 118 is provided with connector terminals 31A to 33A, 31B to 33B, 31C to 33C, 31D to 33D which are capable of connecting four pressure sensors 16 respectively. In this arrangement, the power source voltage Va, which is supplied from the DC power source unit 12, is supplied via a common diode 52 through respective resistors (power source current-detecting means) 50A, 50B, 50C, 50D respectively to the connector terminals (31A, 32A), (31B, 32B), (31C, 32C), (31D, 32D). In the embodiment shown in FIG. 4, the connector terminals 31D, 32D, 33D are preparatory terminals.

The voltage signals Vr1 to Vr4 between the terminals, which are generated in the resistors 50A, 50B, 50C, 50D, are amplified by differential amplifiers 54A, 54B, 54C, 54D respectively, and then they are converted by A/D converters 61A, 61B, 61C, 61D respectively into voltage signals VrA, VrB, VrC, VrD as digital signals to be supplied to a microcomputer 164.

Voltage signals VoutA, VoutB, VoutC of the pressure sensors 16A, 16B. 16C, which are generated on the terminals 33A, 33B, 33C, are supplied to fixed ports 80b, 80c, 80d for constructing a multiplexer 80 respectively. A voltage signal VoutD, which is generated on the terminal 33D, is supplied to the remaining fixed port 80e.

An unillustrated resistor having a high resistance value is connected between the ground terminal and each of the terminals 33A, 33B, 33C, 33D to effect pull down to zero volt so that the voltage, which appears on the terminal 33A, 33B, 33C, 33D, is not subjected to floating, for example, when the pressure sensor 16A is not connected to the terminal 33A, 33B, 33C, 33D.

The voltage signal, which appears on the common port 80a of the multiplexer 80, is amplified by the aid of an amplifier 56, and it is converted by an A/D converter 62 into the voltage signal Vout as the digital signal to be supplied to the microcomputer 164. The common port 80a of the multiplexer 80 is switched to a desired fixed port 80b to 80d, for example, in accordance with a 2-bit signal supplied to a switching port 80f from the microcomputer 164.

Figure 5:
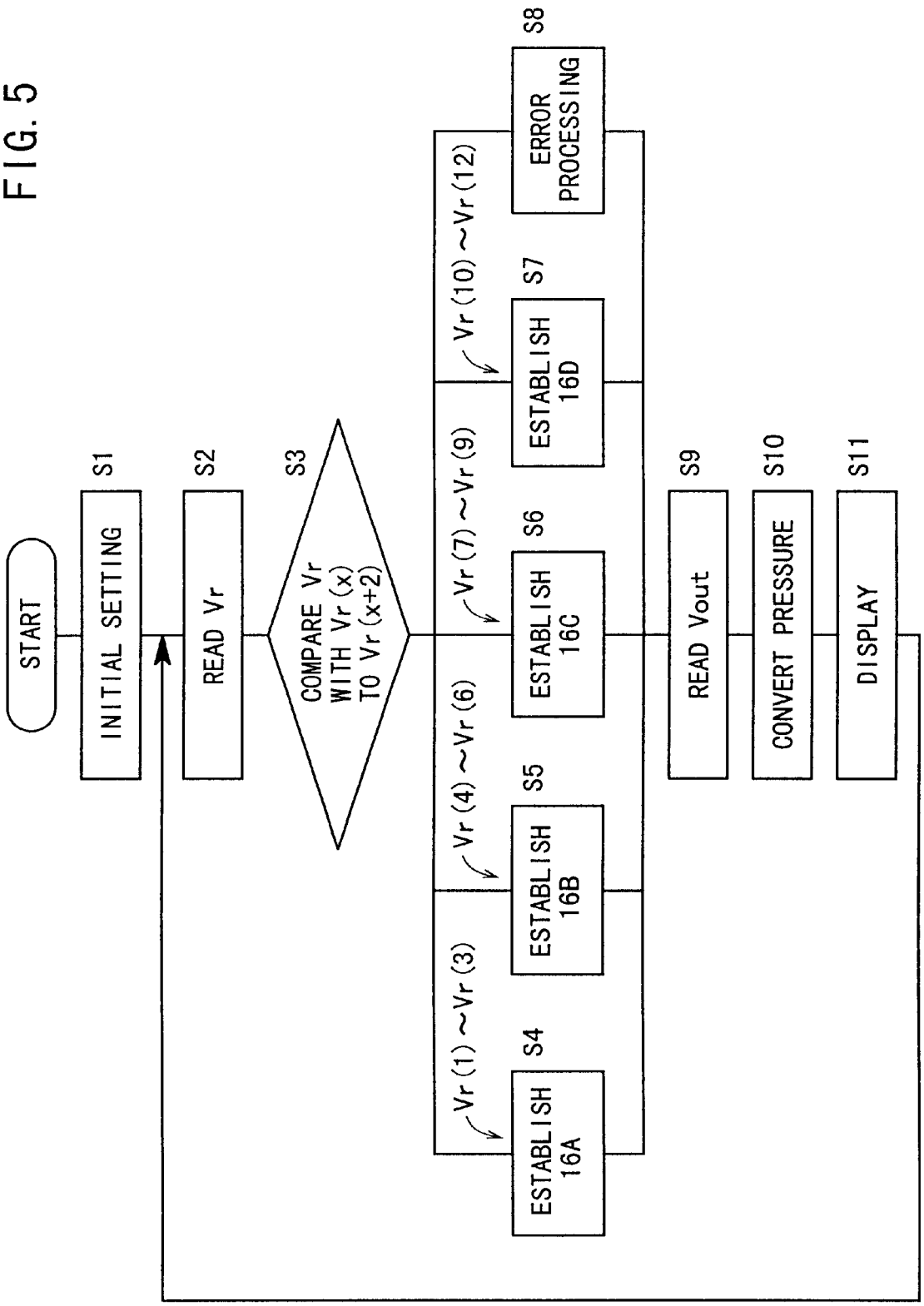
FIG. 5 shows a flow chart to be used to explain the operation of the embodiment shown in FIG. 4.

Next, explanation will be made with reference to a flow chart shown in FIG. 5 principally for the function of the pressure sensor system 110 of the embodiment shown in FIG. 4 to automatically identify the type.

The initial processing shown in the step S1 is performed when the power source of the pressure sensor control apparatus 118 is turned on after the power source of the DC power source unit 12 is turned on in FIG. 4. In the initial processing, the automatic identification program in ROM 68 is read by CPU 66 to start the control. The type conversion table 74 written in ROM 68 shown in FIG. 3, and the unillustrated voltage-pressure conversion table for converting the voltage signal Vout corresponding to the applied pressure of the pressure sensor 16 into the pressure value are read into RAM 70.

Subsequently, in the step S2, the respective voltage signals VrA, VrB, VrC, VrD, which correspond to the voltage drops generated in the respective resistors 50A, 50B, 50C, 50D by the power source currents IpA, IpB, IpC, IpD (IpD=0) as the consumption currents flowing through the pressure sensors 16A, 16B, 16C, are read from the outputs of the A/D converters 61A, 61B, 61C, 61D respectively.

Subsequently, in the step S3, the read voltage signals VrA, VrB, VrC, VrD are compared with the threshold value ranges Vr(x) to Vr(x+2) (x=1, 4, 7, 10, 13). If the voltage signals VrA, VrB, VrC in the respective threshold value ranges Vr(1) to Vr(3), Vr(4) to Vr(6), Vr(7) to Vr(9), Vr(10) to Vr(12) are detected, it is automatically identified in the steps S4, S5, S6 that the pressure sensors 16A, 16B, 16C are connected respectively.

In the embodiment shown in FIG. 4, the pressure sensor 16 is not connected to the terminal 31D. Therefore, the processing in the step S7 is not performed, and the error processing in the step S8 is performed. In this case, in the error processing in the step S8, VrD=zero volt is detected as the voltage signal Vr. Accordingly, the microcomputer 164 determines that the power source current value is not more than the prescribed value, and it judges that no pressure sensor 16 is connected to the terminal 31D.

Subsequently, in the step S9, the common port 80a of the multiplexer 80 is successively switched to the fixed ports 80b, 80c, 80d on the basis of the result of the automatic identification processing for the pressure sensor (steps S2 to S8). Every time when the switching is performed, the voltage signal Vout (VoutA, VoutB, VoutC), which is the output signal of the pressure sensor 16A, 16B, 16C, is read by the microcomputer 164 by the aid of the A/D converter 62.

Subsequently, in the step S10, the read voltage signals VoutA, VoutB, VoutC are converted into the pressure values respectively with reference to the unillustrated voltage-pressure conversion table.

The results of conversion into the pressure values are displayed in the step Sll on the display unit 72 in relation to the pressure sensors 16A, 16B, 16C respectively.

Thereafter, the operations are repeatedly performed for the automatic identification processing for the pressure sensor in the steps S2 to S8, the reading processing for the voltage signal in the step S8 on the basis of the result of the automatic identification processing, the pressure conversion processing in the step S9, and the display processing in the step S11.

As described above, the embodiment shown in FIG. 4 explained above is constructed to have the plurality of connection terminals (31A, 32A, 33A), (31B, 32B, 33B), (31C, 32C, 33C), (31D, 32D, 33D) each composed of the three individuals (three lines as the input/output lines respectively) which make it possible to simultaneously connect the four pressure sensors 16 having the different power source current values Ip. Therefore, an effect is achieved such that the types of the plurality of, i.e., the four of the pressure sensors 16A to 16D in the embodiment shown in FIG. 4 can be simultaneously identified by using the one pressure sensor control apparatus 118. It is a matter of course that even when four pressure sensors 16A having the same specification are connected to the connection terminals (31A, 32A, 33A), (31B, 32B, 33B), (31C, 32C, 33C), (31D, 32D, 33D), the pressure values, which are based on the output voltage signals Vout corresponding to the applied pressures detected by the respective pressure sensors 16A, can be displayed on the display unit 72.

It is a matter of course that the present invention is not limited to the embodiments described above, which may be embodied in other various forms without deviating from the gist or essential characteristics of the present invention, for example, such that the present invention is also applicable to the voltage-driven form which is different from the current-driven form of the main pressure sensor body 45.

Further, the resistor 40 as the power source current setting means may be replaced with a current source composed of, for example, an integrated circuit.

As explained above, according to the pressure sensor, the pressure sensor control apparatus, and the pressure sensor system concerning the present invention, the type can be reliably identified even when the input/output lines of the pressure sensor is three.

Further, an effect is achieved such that a plurality of types can be identified.

What is claimed is:

1. A pressure sensor comprising:
   three terminals, the three terminals comprising first and second input terminals for connection to a DC power source, and a third signal output terminal for outputting a signal corresponding to an applied pressure; and
   power source current-setting means for setting a power source current value flowing through said DC power source input terminal as a consumption current flowing through said pressure sensor, said power source current value being different depending on a type of said pressure sensor.

2. A pressure sensor control apparatus to be connected with DC power source input terminals composed of two terminals, and a signal output terminal for outputting a signal corresponding to an applied pressure, of a pressure sensor, for performing a predetermined process in accordance with said signal output, said pressure sensor control apparatus comprising:
   power source current value-detecting means for detecting a power source current value set by said pressure sensor as a consumption current flowing through said DC power source input terminals; and
   type-identifying means for identifying a type of said pressure sensor in accordance with a detected power source current value.

3. The pressure sensor control apparatus according to claim 2, further comprising:
   a display unit to be connected to said type-identifying means wherein:
   said type-identifying means displays an identified type identification name on said display unit.

4. The pressure sensor control apparatus according to claim 2, further comprising:
   a display unit to be connected to said type-identifying means; and
   a type conversion table which is referred to by said type-identifying means and which stores a corresponding relationship between said power source current value and a type of said pressure sensor, wherein:
   said type-identifying means displays an identified type identification name on said display unit; and
   said type-identifying means determines impossibility of type judgement if said power source current value detected by said power source current-detecting means is within a range in which no corresponding type is set in said type conversion table, and it displays this fact on said display unit.

5. The pressure sensor control apparatus according to claim 2, further comprising:
   a display unit to be connected to said type-identifying means, wherein:
   said type-identifying means determines no connection of said pressure sensor if said power source current value is not more than a prescribed value, and it displays this fact on said display unit.

6. The pressure sensor control apparatus according to claim 2, further comprising:
   a plurality of connection terminals which make it possible to simultaneously connect a plurality of pressure sensors having different power source current values, wherein:
   said type-identifying means detects said power source current values flowing through said respective DC power source input terminals of said plurality of pressure sensors to identify respective types.

7. The pressure sensor control apparatus according to claim 6, further comprising:
   a display unit to be connected to said type-identifying means, wherein:
   said type-identifying means displays an identified type identification name on said display unit.

8. The pressure sensor control apparatus according to claim 6, further comprising:
   a display unit to be connected to said type-identifying means; and
   a type conversion table which is referred to by said type-identifying means and which stores a corresponding relationship between said power source current value and a type of said pressure sensor, wherein:
   said type-identifying means displays an identified type identification name on said display unit; and
   said type-identifying means determines impossibility of type judgement if said power source current value detected by said power source current-detecting means is within a range in which no corresponding type is set in said type conversion table, and it displays this fact on said display unit.

9. The pressure sensor control apparatus according to claim 6, further comprising:
   a display unit to be connected to said type-identifying means, wherein:
   said type-identifying means determines no connection of said pressure sensor if said power source current value is not more than a prescribed value, and it displays this fact on said display unit.

10. A pressure sensor system comprising:
    a plurality of pressure sensors each having power source current values set therein as respective consumption currents which are different from each other, each of said pressure sensors comprising:
    DC power source input terminals composed of two terminals;
    a signal output terminal for outputting a signal corresponding to an applied pressure; and
    power source current-setting means for setting a power source current value flowing through said DC power source input terminals as a consumption current flowing through said pressure sensor, said power source current value being different depending on a type of said pressure sensor; and
    a pressure sensor control apparatus including type-identifying means to which said pressure sensors are connected, for detecting said power source current values to identify said type of said pressure sensor when a predetermined process is performed in accordance with an output of said pressure sensor.

11. The pressure sensor system according to claim 10, further comprising:
    a display unit to be connected to said type-identifying means, wherein:
    said type-identifying means displays an identified type identification name on said display unit.

12. The pressure sensor system according to claim 10, further comprising:
    a display unit to be connected to said type-identifying means; and
    a type conversion table which is referred to by said type-identifying means and which stores a corresponding relationship between said power source current value and a type of said pressure sensor, wherein:

said type-identifying means displays an identified type identification name on said display unit; and said type-identifying means determines impossibility of type judgement if said power source current value detected by said power source current-detecting means is within a range in which no corresponding type is set in said type conversion table, and it displays this fact on said display unit.

13. The pressure sensor system according to claim 10, further comprising:

a display unit to be connected to said type-identifying means, wherein:

said type-identifying means determines no connection of said pressure sensor if said power source current value is not more than a prescribed value, and it displays this fact on said display unit.

* * * * *